(12) United States Patent
Petersen et al.

(10) Patent No.: US 7,298,533 B2
(45) Date of Patent: Nov. 20, 2007

(54) OPTICAL FILMS FOR CREATING UNIQUE OPTICAL EFFECTS

(75) Inventors: Joel M. Petersen, Valley Village, CA (US); Christopher Chapman Rich, Rancho Palos Verdes, CA (US)

(73) Assignee: Wavefront Technology, Paramount, CA (US)

( * ) Notice: Subject to any disclaimer, the term of this patent is extended or adjusted under 35 U.S.C. 154(b) by 0 days.

(21) Appl. No.: 10/805,850

(22) Filed: Mar. 22, 2004

(65) Prior Publication Data

US 2004/0196516 A1 Oct. 7, 2004

Related U.S. Application Data

(60) Provisional application No. 60/456,541, filed on Mar. 24, 2003.

(51) Int. Cl.
*G02B 5/32* (2006.01)
*G02B 5/18* (2006.01)
*G02B 3/08* (2006.01)

(52) U.S. Cl. .................. 359/15; 359/569; 359/567; 359/742

(58) Field of Classification Search ............... 359/1, 359/2, 15, 20, 21, 23, 32, 567, 569, 742, 359/565; 283/86; 428/172, 11; 472/63; 358/15
See application file for complete search history.

(56) References Cited

U.S. PATENT DOCUMENTS

| | | | | |
|---|---|---|---|---|
| 3,661,385 A | * | 5/1972 | Schneider | 472/63 |
| 4,492,442 A | * | 1/1985 | Gaudyn | 353/10 |
| 5,956,164 A | * | 9/1999 | Waitts | 359/2 |
| 6,700,712 B2 | * | 3/2004 | Servatius et al. | 359/742 |
| 6,800,357 B2 | * | 10/2004 | Keberlein | 428/172 |

\* cited by examiner

*Primary Examiner*—Audrey Chang
(74) *Attorney, Agent, or Firm*—Knobbe, Martens, Olson & Bear LLP

(57) ABSTRACT

An optical layer comprises a sheet of material having a surface. The surface comprises a plurality of optical elements. The optical elements are comprised of microscopic patterns in the surface that cooperate to produce an image. Each of the elements has a focal length. At least some of the focal lengths are significantly different from other focal lengths, such that some portions of the surface appear to be closer to a viewer than other portions of the surface.

42 Claims, 7 Drawing Sheets

OPTICAL FILMS FOR CREATING UNIQUE OPTICAL EFFECTS

PRIORITY APPLICATION

This application claims the benefit under 35 U.S.C. 119(e) of U.S. Provisional Patent Application 60/456,541, filed on 24 Mar. 2003, the entire disclosure of which is hereby incorporated by reference herein.

FIELD OF THE INVENTION

The present invention relates generally to optical films, sheets, or layers that create unique optical effects, and more specifically to optical films, sheets, or layers comprising a plurality of optical elements that form images at different distances from a surface of the film, sheet, or layer, thereby creating unique optical effects.

BACKGROUND OF THE INVENTION

Decorative films and coatings are used for a variety of purposes such as to provide a desired aesthetic appearance, to attract a consumer's attention, or to create a particular visual effect such as a rainbow of colors. A variety of such decorative films are reflective. Examples of such decorative films include diffraction gratings on children's athletic shoes and hair accessories as well as on packages of toothpaste and cereal to name a few. Another common example includes holograms placed on credit cards for security purposes. More generally, such optical films and coatings may be used on decorative signs, packaging, consumer goods, and for other applications as well. Manufacturing processes for incorporating such simple optical elements into films are well-established, economical, and straightforward. Accordingly, striking decorative optical effects that can be practically implemented are thus both useful and desirable.

SUMMARY OF THE INVENTION

A unique film comprising a sheet having optical elements capable of forming a plurality of images at different distances from a surface of the film or sheet has been developed and corresponds to a preferred embodiment of the invention. This film can be used in a wide variety of applications, including but not limited to uses related to packaging, signage, and decoration.

In another embodiment of the present invention, an optical structure comprises a sheet of material having a surface. The surface comprises a plurality of optical elements. The optical elements are comprised of microscopic patterns in the surface that cooperate to produce an image. Each of the elements has a focal length. At least some of the focal lengths are significantly different from other focal lengths, such that some portions of the surface appear to be closer to a viewer than other portions of the surface.

In another embodiment of the present invention, a method of creating an optical effect from an image comprises producing ten or more copies of the image arranged in side-by-side relationship. Producing the copies of the images comprises using microscopic patterns in a surface to form some of the copies at different distances from a viewer than other of the copies. Examples of such microscopic patterns include Fresnel lenses and diffractive optical elements like diffraction gratings and holograms.

In another embodiment of the present invention, a method of creating an optical effect from an image comprises producing at least first and second copies of the image at least partially superimposed over each other. Producing the first and second copies comprises using microscopic patterns in a surface to form the first of the copies at different distances from the viewer than the second of the copies. These first and second copies may be formed by microscopic patterns comprising first and second Fresnel lenses or diffractive optical elements having different focal lengths that have been superimposed.

BRIEF DESCRIPTION OF THE DRAWINGS

Exemplary embodiments of optical films, sheets, and layers are illustrated in the accompanying drawings, which are for illustrative purposes only. The terms film, sheet, and layer are used herein interchangeably. The drawings comprise the following figures, in which like numerals indicate like parts.

DETAILED DESCRIPTION OF PREFERRED EMBODIMENTS

The embodiments described herein relate to structures such as optical films, sheets, and layers comprising multiple optical elements. As described above, the terms film, sheet, and layers are used interchangeably as the meaning of these terms are generally the same.

As expounded above, these optical films may be useful for a variety of purposes, for instance, to capture a person's attention or to create a striking visual or aesthetic effect. Furthermore, these particular optical sheets, films, and layers produce unique three-dimensional appearances and motion effects when objects are moved relative to the optical layer.

Figure 1:
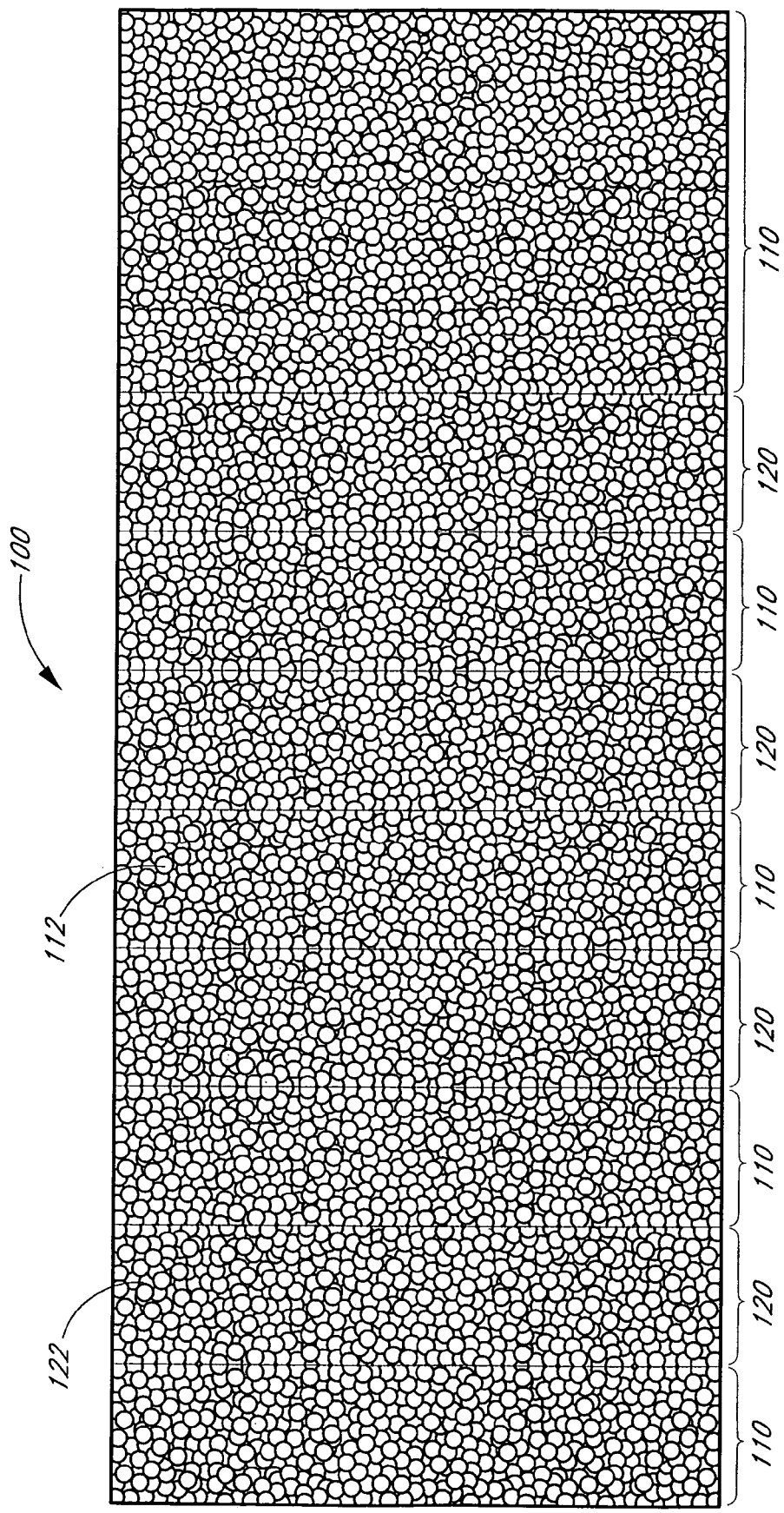
FIG. 1 is a schematic diagram of one embodiment of an optical sheet having multiple first regions and multiple second regions, wherein the first regions contain multiple first optical elements, and the second regions contain multiple second optical elements.

An exemplary embodiment of a optical sheet 100 is illustrated in FIG. 1. The optical sheet 100 comprises a surface having a plurality of first regions 110 and a plurality of second regions 120. In FIG. 1, the first and second regions 110, 120 are adjacent to each other. Although the first and second regions 110, 120 of the optical sheet 100 illustrated in FIG. 1 comprise a series of columns having substantially constant width, in other embodiments the regions can be columns of variable width. The sizes of the regions 110, 120 may vary. The regions 110, 120 can also have different shapes and should not be restricted to any particular shape such as columns or rows. The size and shape of the regions 110, 120 can also differ across the optical sheet. The size and shape may be comprise a pattern, image or picture, design, and may be a letter, numeral, character, symbol, etc.

Figure 2:
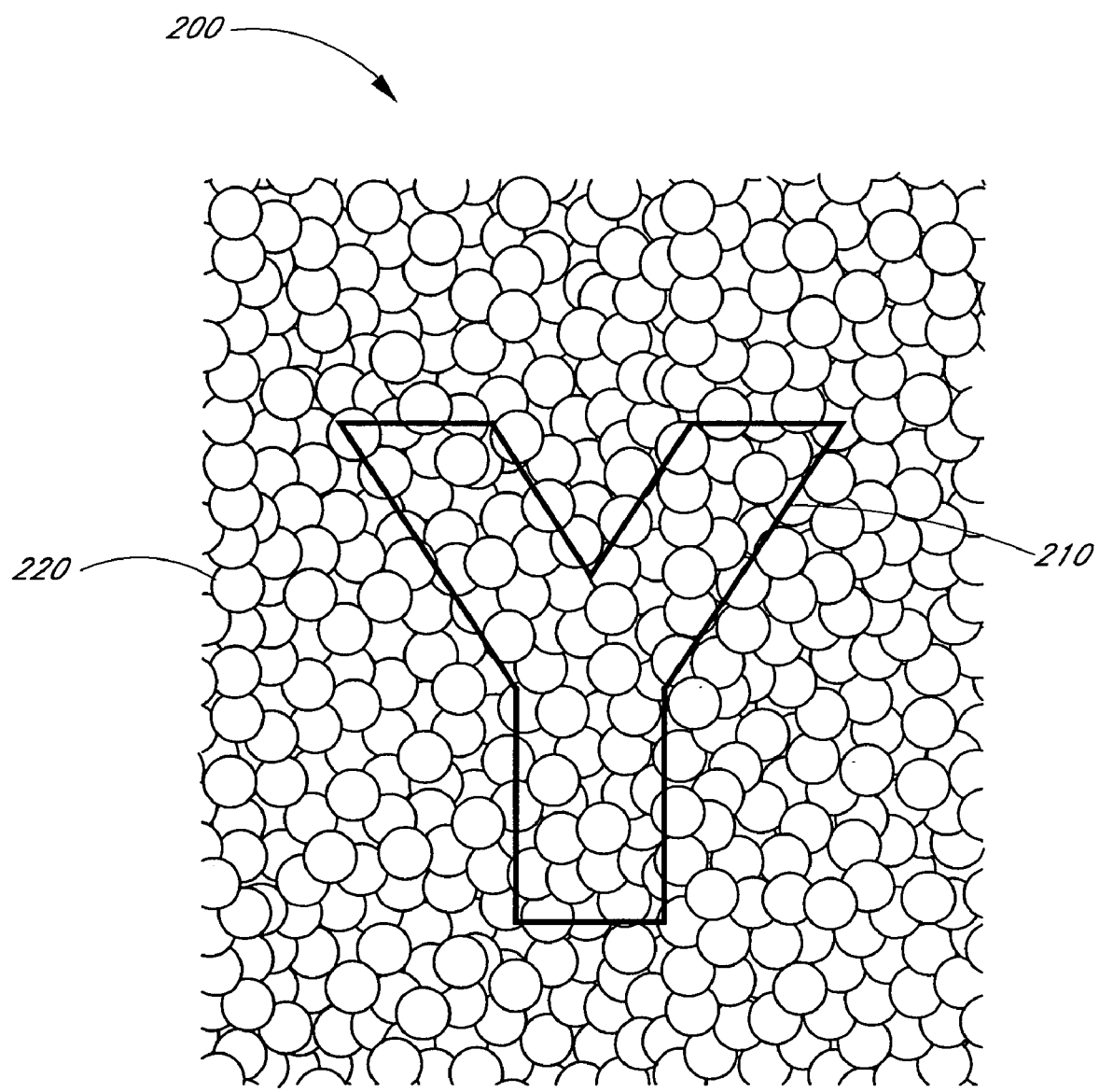
FIG. 2 is a schematic diagram of one embodiment of an optical sheet having a first region within a second region, wherein the first region contains multiple first optical elements, and the second region contains multiple second optical elements, and said first region is shaped in the form of a letter, Y.

An example of an alternative configuration is illustrated in FIG. 2, which shows an optical sheet 200 having a first region 210 defining a shape within a second region 220. The first region 210 is configured to be in the shape of a letter "Y". This first region 210 is surrounded by the second region 220, which serves as a background for the first region. In this example, the first region 210 is separated from the second region 220 by a small distance, although such separation is not required. In other embodiments, other configurations for the first and second regions 210, 220 can be used to create other graphical effects. The first and second regions 210, 220 may, for example, be configured and arranged in the shape of other images or pictures such as stars, flowers, or more abstract designs. The first and second region 210, 220 may have a shapes that form letters, numbers, characters, symbols, text, or other graphics and should not be limited only to those examples described herein.

Likewise, although the optical sheet 100, 200 shown in FIGS. 1 and 2 are rectangular, in other embodiments the optical sheet may have other shapes including, non-polygonal shape such as a circle, and may have arbitrary or irregular shapes. The shape of the layer 100, 200 may be selected to conform to an area on an object on which the layer is disposed. The optical 100, 200 sheet may, for example, be affixed to an item such as a consumer good, package, sign, etc. using, e.g., adhesive or other technique for securing the optical sheet in place.

Again with reference to the exemplary embodiment illustrated in FIG. 1, the first regions 110 comprise a plurality of first optical elements 112. The first optical elements 112 comprise optical elements capable of being formed in or on a film, sheet or layer, such as a Fresnel lenses, holographic optical elements, or other diffractive optical elements. Other types of optical elements capable of being formed in or on a sheet are also possible. Similarly, the second regions 120 comprise a plurality of second optical elements 122. These second optical elements 122 may also comprise Fresnel lenses, diffractive optical elements, or other types of optical elements capable of being formed in or on a sheet. Therefore, there exist first optical elements 112 in the first regions 110 in this embodiment that are directly adjacent to second optical elements 122 in the second regions 120. These optical elements 110, 112 may be reflective or transmissive. The sheets 100 may be colored. For example, a reflective layer may have a colored tint. Similarly, a transmissive film included in the sheet may also possess color independent of dispersion effects.

Preferably, the first and second regions 110, 120 comprise a large number of optical elements to create an optical effect. In one embodiment, a region comprises ten or more optical elements. In another embodiment, a region comprises 25 or more optical elements. In other embodiments, a region comprises 100 or more optical elements. A region may also comprise 1000 or more optical elements as well, although the possible ranges should not be limited to these. The plurality of first regions 110 may comprise different numbers or equal numbers of optical elements. The plurality of second regions 120 can also comprise different numbers or equal numbers of optical elements. The number of optical elements in the first region or regions 110 may or may not be the same as the number of optical elements in the second region or regions 120.

The size of the optical elements 112, 122 may range between about 1 to 100 mm$^2$. These optical elements 112, 122 may be circular, elliptical, square, rectilinear, or have other regular or irregular shapes as well. In the case where the lenses have irregular shape, the average width of the optical elements may be between about 1 and 100 mm for certain embodiments. Dimensions (e.g., area, width, etc.) outside these ranges, however, are possible.

Preferably, the plurality of first optical elements 112 are adjacent to each other in the first region 110, and the plurality of second optical elements 122 are adjacent to each other in the second region 120, although the embodiments should not be so limited. Also, the diffractive optical elements 112, 122, are depicted as circular or portions of circles having substantially the same radius of curvature. In other embodiments, the optical elements 112, 122 may have shapes other than circles or portions of circles or may be circles or portions of circles having different radii. Examples of other shapes include rectangles, squares, etc., as well as curved and irregular shapes. The shapes of the optical elements 112, 122 may be the same or may be portions of the same geometric object or shape. Alternatively, the shapes of the optical elements 112, 122 may be different or be portions of different shapes. Similarly, although the plurality of optical elements 112, 122 are shown as comprising an irregular pattern in FIG. 1 and 2, partially regular and ordered patterns may also be employed in other embodiments. The shapes and arrangement of the plurality of first optical elements 112 may be the same or different from the shapes and arrangement of the plurality of second optical elements 122.

In an exemplary embodiment, the first and second optical elements 120, 122 have optical power. This optical power may correspond to focal lengths in the range between about ±1 and ±100 millimeter in certain embodiments although focal lengths outside these ranges are possible. Accordingly, the first and second optical elements 112, 122 are capable of producing an image from a light beam impinging on the surface of the optical sheet 100. These first and second optical elements 112, 122 preferably focus respective images on respective image planes for each of the optical elements. Preferably, the first optical elements 112 have a different focal length and corresponding optical power than the second optical elements 122. In such embodiments, each of the plurality of first optical elements 112 focuses an image at a first distance $d_1$ from the surface of the optical sheet 100, and each of the plurality of second optical elements 122 focuses an image at a second distance $d_2$ from the surface of the optical sheet 100, wherein $d_1 \neq d_2$.

In various embodiments, the distances $d_1$ and $d_2$ are non-zero distances that can be positive or negative (although the distance could be zero in the case where the optical element does not have optical power). As used herein, a positive distance indicates that an image is formed in front of the surface of the optical sheet 100, and a negative distance indicates that an image is formed behind the surface of the optical sheet 100. Optical elements having positive and negative focal lengths or optical power would produce images in front of and behind the optical sheet 100 (depending on whether the elements are reflective or transmissive). In addition, the image created by optical elements having one focal length may be inverted while images created by optical elements having another different focal length may be upright. In some embodiments, the focal lengths and corresponding distances $d_1$ and $d_2$ have a different sign, whereas in other embodiments, the focal lengths and distances $d_1$ and $d_2$ have the same sign.

As described above, the optical elements may be transmissive or reflective. In the case where the optical elements are reflective, a real image may be formed in front of the optical sheet and a virtual image may be formed behind of the optical sheet. Alternatively, in the case where the optical elements are transmissive, a real image may be formed behind the optical sheet and a virtual image may be formed in front of the optical sheet.

Figure 3:
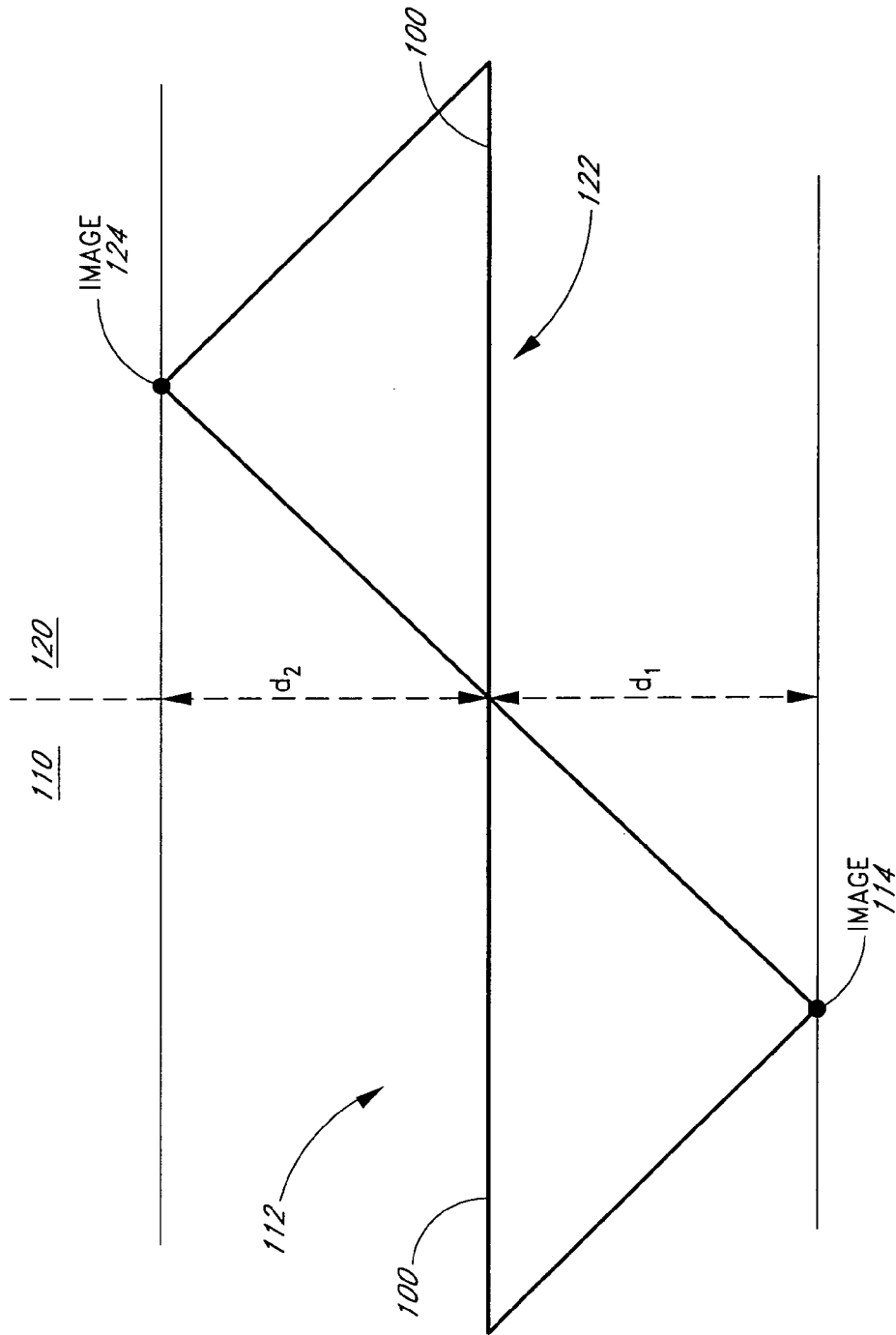
FIG. 3 is a schematic diagram illustrating formation of images of an object at different locations with respect to a surface of an exemplary optical sheet.

These effects are illustrated schematically in FIG. 3. In particular, FIG. 3 shows an optical sheet 100 including a first optical element 112 in a first region 110 and a second optical element 122 in a second region 120. Despite being in different regions, the first and second optical elements 112, 122 are adjacent to each other. Therefore, the first and second optical elements 112, 122 illustrated in FIG. 3 are like many of the optical elements illustrated in FIGS. 1 and 2. As illustrated in FIG. 3, the first optical element 112 forms a first image 114 at a distance $d_1$ from the optical sheet 100, and the second optical element 122 forms a second image 124 at a distance $d_2$ from the optical sheet 100. Therefore, the first and second images are longitudinally separated from each other by a distance $|d_2-d_1|$. As used herein, "longitudinally separated" refers to the distance along a perpendicular to the surface of the optical sheet 100 as shown.

The longitudinal offset adjacent image sets disclosed herein produce a visually striking and appealing appearance that captures a viewer's attention and thus may be useful in marketing to consumers, and especially in consumer packaging and point-of-purchase displays or other marketing displays. The optical sheets, films, and layers can also be used in other applications, such as in architectural applications, which include uses as privacy screens, cubical dividers, wall tiles, and floor tiles. The decorative uses, however, should not be limited to these. Other non-decorative uses, such as to demarcate an area or convey information in, for example, signage, as well as for other potential applications in medicine, science, industry, military or other environments. As indicated above, the optical sheets, films, and layers may be colored. For example, bright yellow, red, or orange films may be used to alert pedestrians to be cautious around potentially hazardous features such as steps, curbs, low hanging pipes, ceilings, doorways, glass windows, etc. Other uses including those not yet realized are envisioned as being possible as well.

Figure 4:
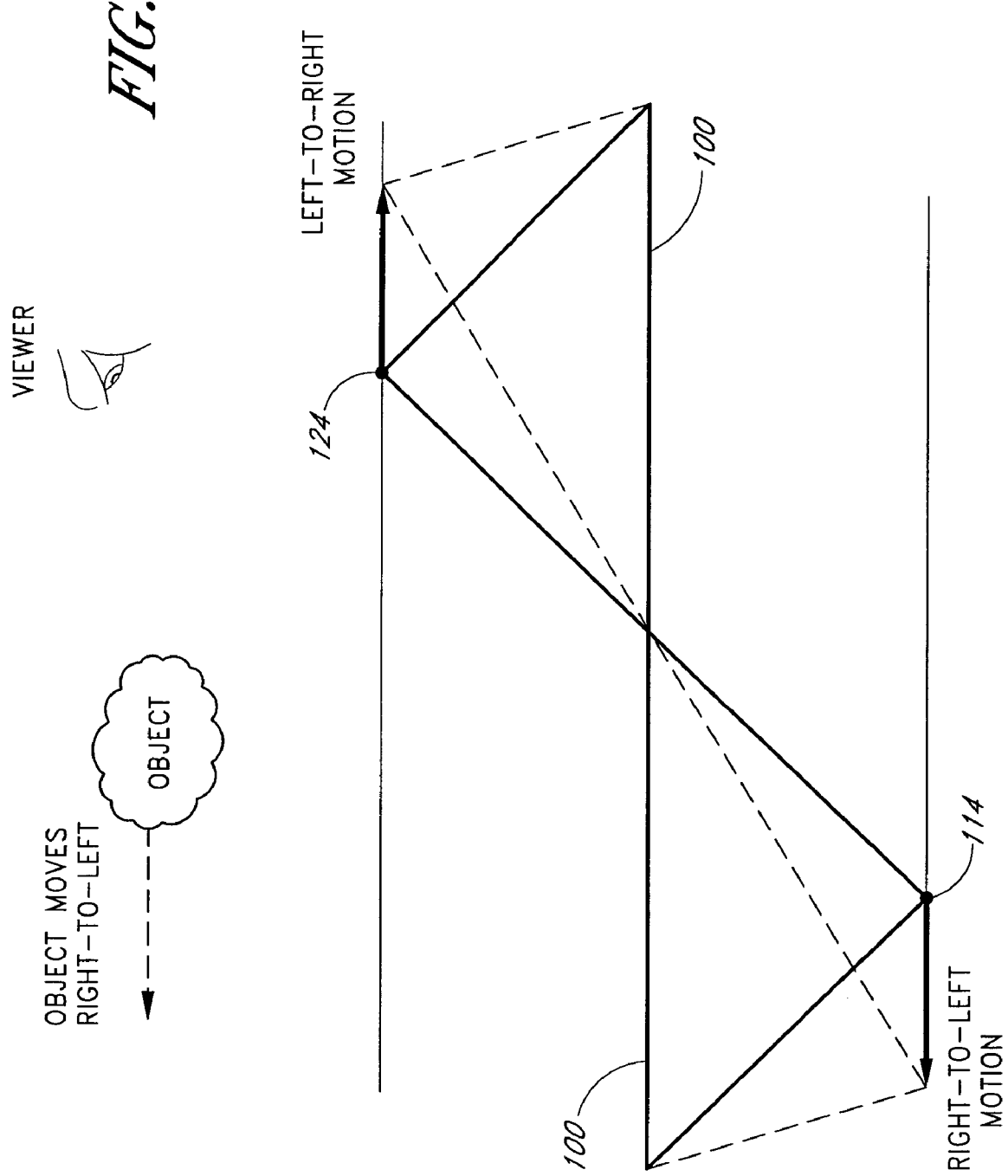
FIG. 4 is a schematic diagram illustrating how images of an object move when an object is moved relative to an exemplary optical sheet.

In addition to creating unique and eye-catching three-dimensional appearances, the longitudinally offset image also exhibit unique motion effects. Exemplary three-dimensional motional effects resulting from optical elements having different, e.g., positive and negative, focal lengths are illustrated schematically in FIG. 4. In particular, FIG. 4 illustrates that when an object moves in a particular direction relative to the optical film 100, a first image 114 formed below the surface of the optical film 100 (that is, $d_1<0$) will move in the same direction as the object, whereas a second image 124 formed above the surface of the decorative film 100 (that is, $d_2>0$) will move in the opposite direction as the object. Where optical elements that create images on opposite sides of the optical film 100 are arranged in adjacent regions, such as in the exemplary embodiment illustrated in FIGS. 1 and 2, this configuration produces a visually striking motion effect when objects are moved relative to the optical film 100.

Although the exemplary optical sheets described herein contain first and second regions of optical elements, in other embodiments, more than two regions of optical elements can be used to form an optical layer. In such embodiments, each of the plurality of regions contains optical elements capable of forming an image at a unique distance or range of distances from the optical film surface. As explained above, this configuration can be used to produce unique three-dimensional appearances and motion effects. Also, the first and second regions can optionally comprise a plurality of sub-regions that may or may not be contiguous with each other. For example, the first region may comprise two or more sub-regions with different positive focal lengths and the second region may comprise two or more sub-regions with different negative focal lengths. Alternatively, the sub-regions in the first region may have different focal lengths but these different focal lengths may be close in length to each other in contrast to the focal length(s) for the second region. Other configurations are possible.

In an exemplary embodiment, the first and second optical elements are of the same type (for example, both are Fresnel lenses). In other embodiments, the first and second optical elements are of different types (for example, the first optical elements are holographic optical elements, and the second optical elements are Fresnel lenses). Different types of optical elements can be mixed in other ways in a region or plurality of regions.

The optical elements preferably comprise microscopic patterns such as miniature curved or inclined or declined refractive (or reflective) surfaces as in the case of Fresnel lenses. The optical elements may also comprise surface relief features such as grooves or rulings or other phase change features such as index of refraction variations in the case of diffractive optical elements. These features may be circular, elliptical, cylindrical, linear, or have other regular or irregular shape and configurations. These features, whether grooves, miniature refractive features in a Fresnel lens, or diffractive features in a diffractive optical element such as a hologram, are preferably small having an average spacing that may range from between about 0.5 micrometers (μm) to about 2 millimeters (mm). These features also preferably have an average height or depth ranging from between about 0.2 micrometers to about 200 microns. Dimensions (spacing and size) outside these ranges are also possible. In the case where surface relief variations are employed, preferably, the microscopic features comprise features having sufficiently small physical dimension such that the optical elements are substantially smooth on a macroscopic scale across a plurality of optical elements, for example, across a region of 1 centimeter or larger. Accordingly, the optical elements and microscopic patterns are preferably smooth to the touch. Preferably these microscopic patterns are shaped and arranged to provide the desired focal length and optical power.

The microscopic patterns are preferably formed in or on a sheet. This sheet may be substantially transmissive or comprise a reflective surface. For example, a layer of metallization or a thin film dielectric stacked structure may be provided. As described above, the sheet may be colored. Accordingly, a material having color or a film such as a dielectric film that imparts color may be used. The sheet may comprise a flexible or rigid substrate such as for example paper, polyester (PET), polycarbonate (PC), polypropylene (PPOP), acrylic, and glass. Other materials may be used as well. In certain embodiments, a layer such as a polymer layer may be formed on the substrate and the microscopic patterns may be imprinted on this polymer layer. This polymer layer may be cured, for example, by UV curing, heating, exposure to e-beam or using other techniques. Other layers of material may be used to form the microscopic pattern. Alternatively, the microscopic pattern can be formed in the substrate in other embodiments as well. Still other configurations are possible and should not be limited to those described herein.

In some embodiments, the sheet or decorative film may be provided with an adhesive to affix the structure to a surface such as a package, consumer goods, etc. A laminate may also be disposed over the microscopic pattern. As indicated above, other configurations and designs are possible. The sheet, film, or layer produced may be referred herein as product.

Figure 5:
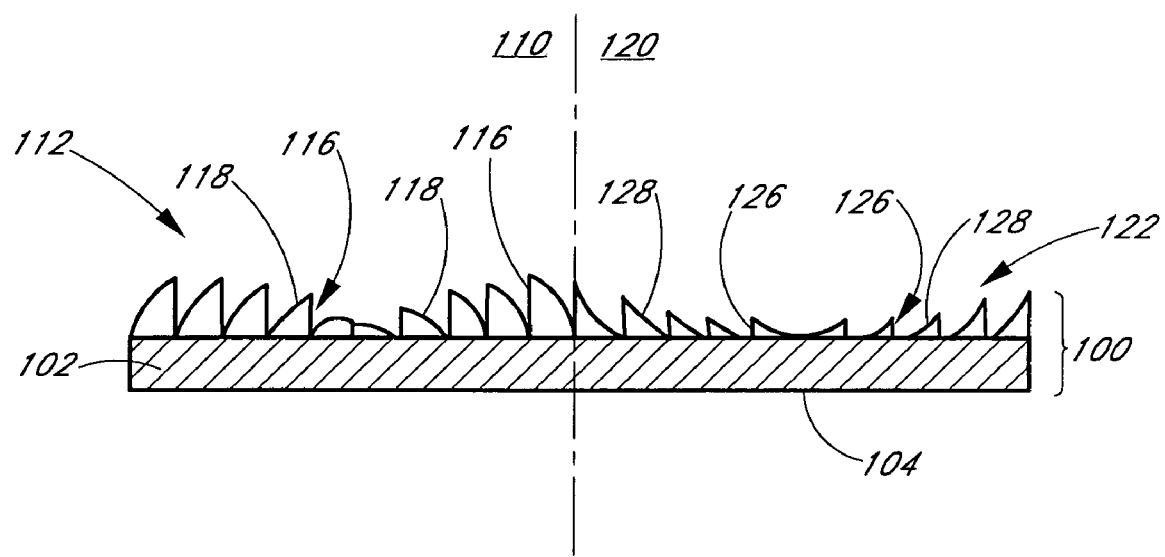
FIG. 5 is a cross-sectional view of one embodiment of an exemplary optical layer comprising a plurality of Fresnel lenses.

A cross-section of an exemplary optical layer or film 100, in an embodiment wherein the optical elements are Fresnel lenses, is illustrated in FIG. 5. As is well known, Fresnel lenses are refractive lenses having a substantially flattened spatial extent. Fresnel lens generally comprise a plurality of concentric or cylindrical rings. These rings comprise refractive surfaces having local curvature and/or inclination/declination similar to that of a conventional piano-convex or plano-concave refractive lens so as to refract light in a manner similar to a conventional non-Fresnel. In one embodiment, the Fresnel lenses formed on the optical film or layer have a diameter of approximately 0.25 inches and have a focal length of approximately 0.50 inches. In certain embodiments, the Fresnel lenses formed on the optical film or layer have a diameter between approximately 0.10 inches and approximately 0.50 inches. In still other embodiments, the Fresnel lenses formed on the optical film or layer have a diameter between approximately 0.01 inches and approximately 1.00 inches. In other embodiments, the Fresnel lenses formed on the optical film or layer have a focal length between approximately 0.25 inches and 0.75 inches. In still other embodiments, the Fresnel lenses formed on the optical film or layer have a focal length between approximately 0.10 inches and approximately 1.00 inches.

As indicated herein, the optical elements can be larger or smaller. For example, optical elements such as Fresnel lenses may be about 2 to 6 inches or larger. One embodiment may comprise an ordered array of square optical elements about 2.4 inch on a side. These optical element may be stepped out into a plurality of rows and columns. The focal length may alternate, positive and negative across a given row and along a given column. For example, the first row may be positive, negative, positive, negative . . . , the second row may be negative, positive, negative, positive, the third row may be positive, negative, positive, negative, . . . , etc., to produce a striking visual effect. The size of the optical element may be larger, e.g. 4 or 6 inches or more across or may be smaller. Other configurations are possible.

FIG. 5 illustrates a cross-sectional view of a first Fresnel lens optical element 112 formed in a first region 110 of the optical film or layer 100, and an adjacent second Fresnel lens optical element 122 formed in a second region 120 of the optical film or layer 100. In this exemplary embodiment, the first and second optical elements 112, 122 are formed over a substrate 102. The first Fresnel lens optical elements 112 comprises a plurality of rings 116 having curved or inclined/declined refractive surfaces 118 that refract light so as to form images. The second Fresnel lens optical elements 122 also comprises a plurality of rings 126 having curved or inclined/declined refractive surfaces 128 that refract light so as to form images. FIG. 5 shows first and second Fresnel lens refractive optical elements 112, 122 having approximately equal power of opposite sign. In such cases, the cross-sectional profiles may be the complement or the inverse of each other, the convex shapes curvatures of the rings in the first lens element 112 being opposite to or the negative of the concave shaped curvatures of the rings in the second lens element 122.

As described above, in some embodiments, the substrate 102 is reflective, and in other embodiments the substrate 102 is substantially transparent. In an exemplary embodiment, the substrate comprises a flexible material, such as a polymeric sheet or paper board, although in other embodiments the substrate comprises a rigid material, such as glass or rigid plastic. In a modified embodiment, additional optical elements (not shown) are formed on the backside 104 of the substrate 102, effectively allowing a two-sided sheet or film 100 to be created. In another modified embodiment, the optical elements are coated with a laminate, such that the finished optical sheet or film has a smooth surface.

Figure 6:
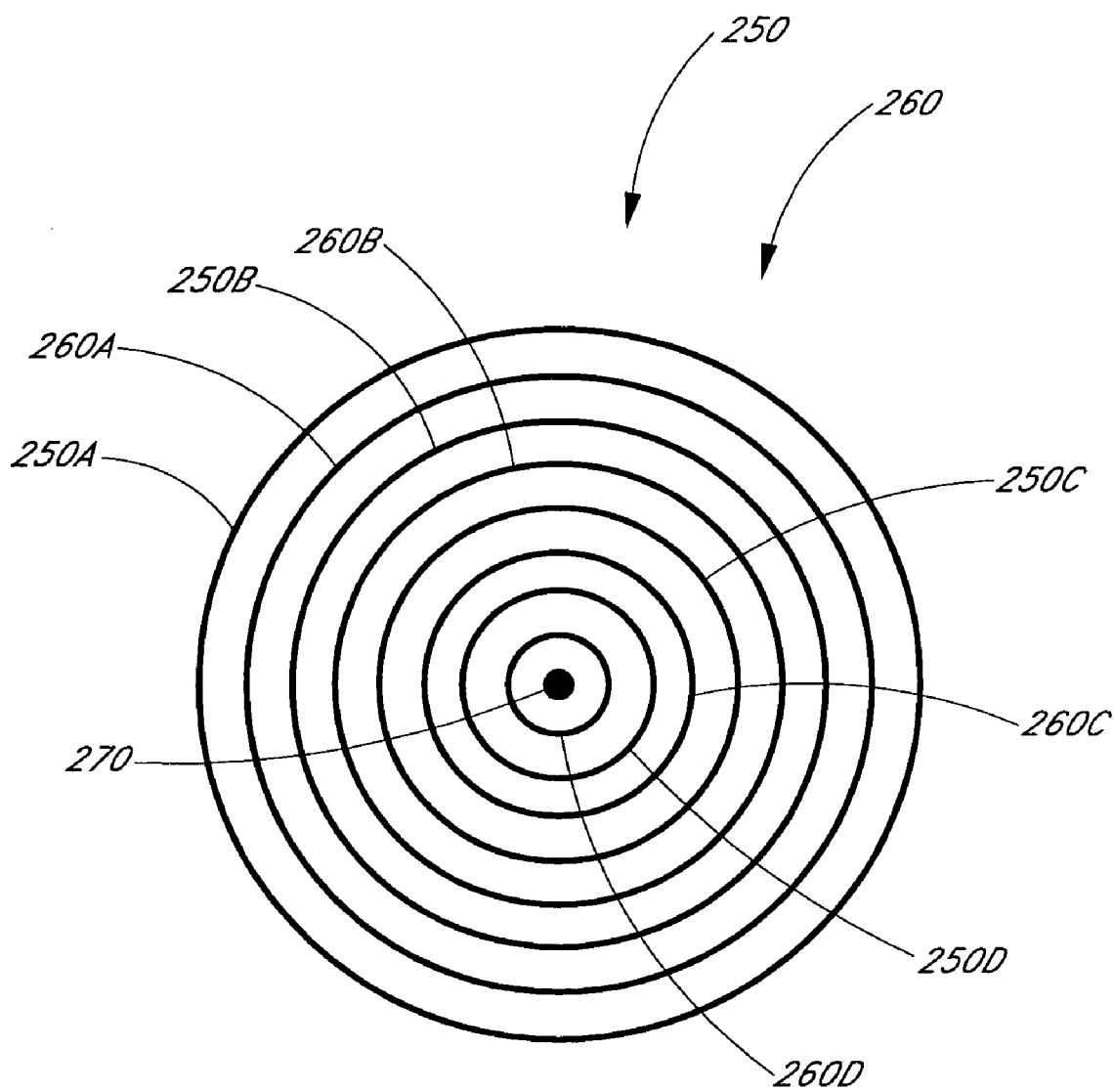
FIG. 6 is a schematic diagram illustrating an exemplary embodiment of first and second optical elements superimposed on each other to provide first and second images substantially superimposed on each other.

In various embodiments such as illustrated in FIG. 6, two or more optical elements having different optical power and focal lengths may be superimposed over each other. These two or more lens elements may comprise Fresnel lenses or diffractive optical elements for example. Other types of optical elements capable of being formed in or on a sheet may also be employed. As shown in FIG. 6, a first lens element 250 comprises a first plurality of rings 250A, 250B, 250C, 250D which may correspond, for example, to rings of a Fresnel lens. These rings 250A, 250B, 250C, 250D are concentric about a center 270. These rings 250A, 250B, 250C, 250D may comprise refractive (or reflective) features similar to those depicted in the Fresnel lens 112 of FIG. 5. Preferably, these rings 250A, 250B, 250C, 250D have refractive surfaces that are selected to provide the Fresnel optical element 250 with a first focal length.

FIG. 6 also depicts a second optical element 260 comprising a second plurality of rings 260A, 260B, 260C, 260D that may also correspond to rings of a Fresnel lens. These rings 260A, 260B, 260C, 260D are also concentric about the center 270. These rings 260A, 260B, 260C, 260D may comprise refractive (or reflective) features similar to those depicted in the Fresnel lens 122 of FIG. 5. Accordingly, the first set of rings 250A, 250B, 250C, 250D corresponding to the first optical element 250 may be the inverse, complement, or negative, of the second set of rings 260A, 260B, 260C, 260D corresponding to the second optical element 260. Nevertheless, the rings 260A, 260B, 260C, 260D of the second optical element 260 preferably have refractive surfaces that are selected to provide the second Fresnel optical element 260 with a second focal length.

Although FIG. 6 schematically shows four rings 250A, 250B, 250C, 250D in the first optical element 250 and four rings 260A, 260B, 260C, 260D in the second optical element 260, more or less rings may be included in either of the optical elements. In various preferred embodiments, however, the rings 250A, 250B, 250C, 250D in the first optical element 250 and the rings 260A, 260B, 260C, 260D in the second optical element 260 are mixed together or alternated in some manner. In this case, for example, the rings have the following order:

(1) First ring 250A of first optical element 250,
(2) First ring 260A of second optical element 260,
(3) Second ring 250B of first optical element 250,
(4) Second ring 260B of second optical element 260,
(5) Third ring 250C of first optical element 250,
(6) Third ring 260C of second optical element 260,
(7) Fourth ring 250D of first optical element 250, and
(8) Fourth ring 260D of second optical element 260.

Other configurations are possible. For example, more than two lenses may be superimposed in other embodiments. The ordering can also be different. Additionally, the order may vary from the outermost ring to the center and the same pattern need not be repeated. Other variations are possible.

As described above, the focal length of the first Fresnel optical element 250 and the focal length of the second optical element 260 are preferably different. Accordingly, images of an object are formed at different distances ($d_1$ and $d_2$) from the optical film or sheet. In various preferred embodiments, the focal length of the first Fresnel optical element 250 may be positive and the focal length of the second optical element 260 may be negative. For example, the rings 250A, 250B, 250C, 250D in the first optical element 250 may comprise positive features yielding a positive focal length while the rings 260A, 260B, 260C, 260D in the second optical element 260 may comprise negative features yielding a negative focal length. As described above, one image may be formed in front of the optical sheet and the other image is formed behind the optical sheet. Also, one of the images may be virtual and the other image may be real.

Since the two lenses 250, 260 are superimposed, the images formed by each of these lenses are preferably superimposed or overlap as well. One of these images, however, may be closer to the viewer and one of these images may appear farther from the viewer. Additionally, one of these images may be inverted and one of these images may be upright. The images may have the same size or may have different sizes.

In various embodiments the optical elements 250, 260 may be partially overlapped and need not be completely overlapped. Similarly, the images may be partially overlapped and not completely overlapped.

The pair of overlapped optical elements 250, 260 may range in size from about 1 to 100 millimeters. The resultant focal lengths may range between about 1 to 100 millimeters. Dimensions outside these ranges, however, are possible.

In an embodiment similar to that shown in FIG. 6, the optical elements 250, 260 may comprise diffractive optical element such as holograms. The rings may, for example, comprise phase features such as refractive index modulations or surface relief features (e.g. thickness variations) that alter the optical path length and phase of the light. As discussed above, preferably the diffractive optical elements 250, 260 have different focal lengths. One may be positive and the other may be negative. Accordingly, the phase features in the first optical element 250 may be the reciprocal of the phase features of the second optical element 260. The phases may, for example, differ by $\pi$. As shown in FIG. 6, preferably the pair of optical elements 250, 260 are superimposed or at least partially overlapped and produce images that are partially or substantially overlapped. The rings 250A, 250B, 250C, 250D and 260A, 260B, 260C, 260D are concentric about a common center point 270. Preferably, however, the focal lengths of the two optical elements 250, 260 are different and the respective images formed by these optical elements are formed at different distances from the viewer.

Although a plurality of circular rings are shown in FIG. 6, the optical features may be non-circular. These optical features may, for example, be elliptical or linear or curved or have other regular or irregular shapes and configurations. The patterns need not be symmetric or continuous. Such non-circular diffractive, refractive, or reflective features, may be used for example in holograms or other diffractive optical elements as well as Fresnel lenses. As described above, other optical elements that may be formed in or on the sheet may be employed as well.

Also, although FIG. 6 shows a pair of optical elements 250, 260 overlapped, additional optical elements can be partially or substantially completely overlapped in other embodiments. Also, although a single pair of optical elements 250, 260 is shown, more than one pair can be included in side-by-side arrangement or otherwise laterally displaced across an optical sheet, film, or layer. For example, the optical sheet may include a plurality of pairs stepped and repeated across the sheet or a portion thereof. The plurality of pairs of superimposed optical elements may comprise an ordered array of pairs or a disordered or irregular arrangement, or a pattern that is partially irregular but that exhibits some regularity may be employed. Other variations in the configuration and arrangement are possible as well.

The optical elements formed on the optical films and sheets described herein can be manufactured according to a wide variety of techniques. For example, individual dies for Fresnel lenses or diffractive or holographic optical elements can be formed by diamond turning or photomask techniques. Larger patterns may be formed by step and repeat processes. As discussed above, the arrangement of lenses may be disordered or ordered, e.g., periodic. Larger lens patterns may be embossed onto rolls of film to create the optical sheets.

Figure 7:
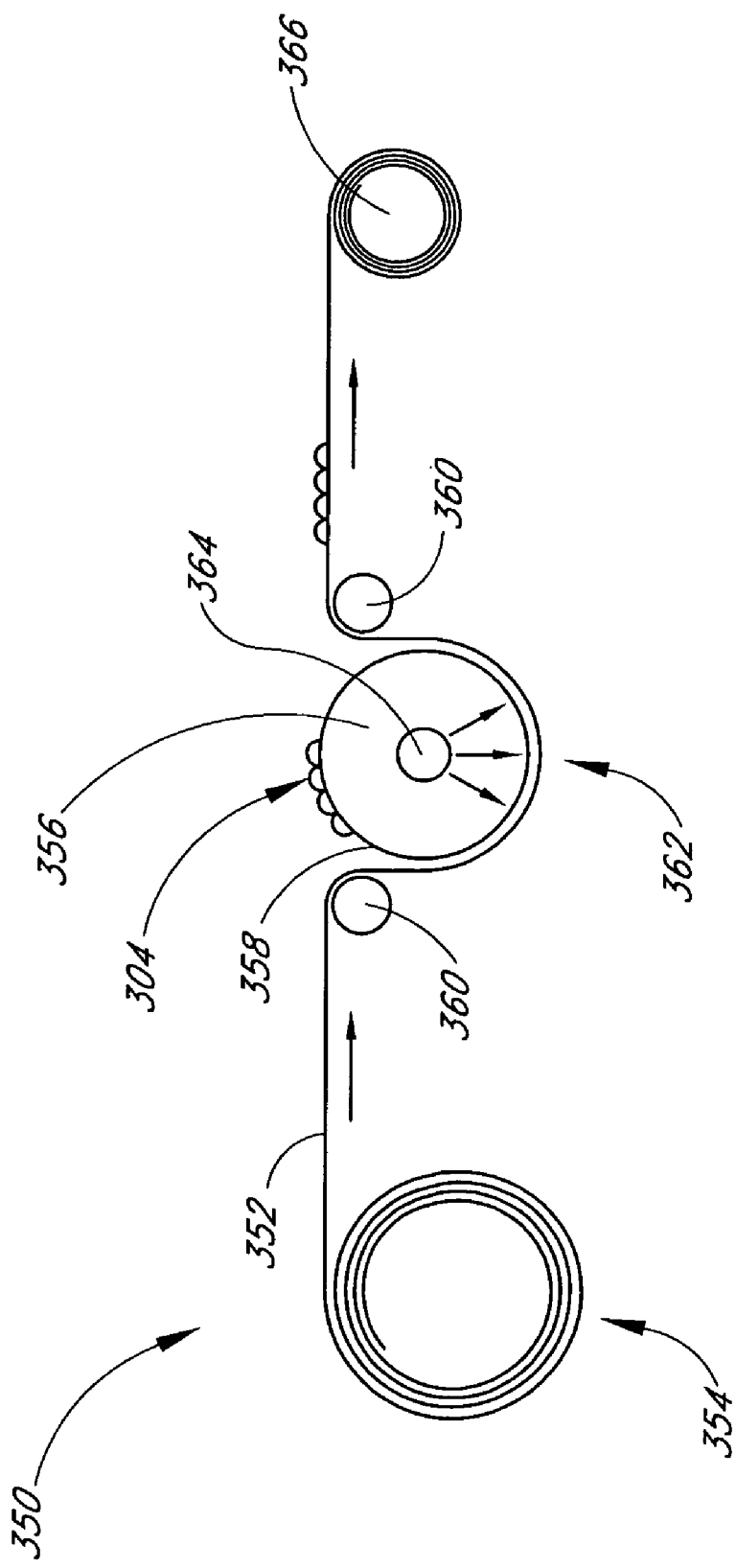
FIG. 7 is a schematic diagram illustrating an exemplary embodiment of a system that can be used to manufacture certain optical sheets described herein.

An exemplary system 350 that can be used to form product as described herein is illustrated in FIG. 7. In this system, a sheet 352 comprising a substrate layer coated with a curable material is fed by a film supply 354, and is ran past a master drum 356 having an outer surface 358 on which a surface relief pattern 304 is formed. The surface relief pattern 304 may correspond to a negative or inverse copy of the features comprising the optical elements to be formed on the finished product. Rollers 360 are positioned adjacent the drum 356 to force the coated sheet 352 against the surface relief pattern 304. The portion of the drum 356 where the curable material makes contact with the drum 356, and is cured, is referred to as the contact area 362. The drum 356 optionally contains a source of ultraviolet light 364 that irradiates the contact area 362 to from optical elements, such as diffractive elements, Fresnel lenses, or holographic elements, in the curable material. The resultant product is taken up by a rotating spool 366. Large sheets can be formed in this manner. Individual sections of product can be die cut from the large sheets. To form the drum, diamond turning, photomasking techniques in combination with step and repeat processes such as described above can be employed. Other approaches are possible as well.

The methods of fabricating the sheets of optical elements should not be limited to those described above or elsewhere herein. Other different approaches in processing and manufacture are possible. For example, surface relieve or volume holographic or other diffractive optical elements may be formed using well-known processes such as contact copying, embossing, casting, and extruding. Multiple replication steps may be employed. One exemplary method of creating a volume diffractive optical elements by embossing a surface relief pattern onto a layer of curable material, is described in greater detail in U.S. patent application Publication U.S. 2003/0124435 A1, entitled "Diffractive Optical Element and Method of Manufacture", and published on 3 Jul. 2003. The entire disclosure of this patent application publication is hereby incorporated by reference herein. Other techniques can be used to create microscopic patterns that form, for example, Fresnel lens, holographic optical elements or other diffractive optical elements.

While the foregoing detailed description discloses several embodiments of the present invention, it should be understood that this disclosure is illustrative only and is not limiting of the present invention. It should be appreciated that the specific configurations and operations disclosed can differ from those described above, and that the methods described herein can be used in other contexts.

We claim:

1. An optical product comprising:
a sheet of material having a surface, the surface comprising a plurality of optical elements each comprised of microscopic ring patterns in the surface that cooperate to produce an image, each of the elements having optical power and a focal length, at least some of the focal lengths being substantially different from other focal lengths such that the optical power of some of the elements are different, such that multiple images of a viewer disposed with respect to the surface are formed by respective optical elements at different distances.

2. The product of claim 1, wherein the optical elements comprise Fresnel lenses.

3. The product of claim 1, wherein the optical elements comprise diffractive optical elements.

4. The product of claim 3, wherein the optical elements comprise holographic optical elements.

5. The product of claim 1, wherein at least some of the focal lengths are positive and others of the focal lengths are negative.

6. The product of claim 1, wherein the microscopic patterns comprise a plurality of grooves formed in the surface.

7. The product of claim 6, wherein said plurality of grooves have an average spacing of between about 0.5 micrometers to about 2 millimeters.

8. The product of claim 6, wherein said plurality of grooves have an average depth of between about 0.2 micrometers to about 200 micrometers.

9. The product of claim 1, wherein said surface is substantially smooth on a macroscopic scale across a plurality of said optical elements.

10. The product of claim 1, wherein said surface is substantially smooth on a macroscopic scale across a region of 1 centimeter or larger.

11. The product of claim 1, wherein said sheet of material is substantially transmissive.

12. The product of claim 1, wherein said sheet of material is reflective such that said image is a reflected image.

13. The product of claim 12, wherein said sheet of material comprises a reflective layer.

14. The product of claim 13, wherein said reflective layer comprises a layer of metallization.

15. The product of claim 13, wherein said reflective layer comprises a thin film dielectric coating.

16. The product of claim 1, wherein said sheet comprises material selected from the group consisting of paper, polyester, polycarbonate, polypropylene, acrylic, and glass.

17. The product of claim 1, further comprising an adhesive formed on said sheet for adhering said sheet to a surface.

18. The product of claim 1, further comprising a laminate disposed over the surface to produce a substantially smooth surface.

19. The product of claim 1, wherein the sheet comprises a flexible sheet.

20. The product of claim 1, wherein the sheet comprises a rigid sheet.

21. The product of claim 1, wherein the optical elements are arranged in a pattern.

22. The product of claim 1, wherein a plurality of said optical elements having substantially the same optical power are included in a first region adjacent to a second region comprising a plurality of optical elements having substantially different optical power.

23. The product of claim 1, wherein a first plurality of said optical elements having substantially similar focal lengths are juxtaposed with respect to a second plurality of said optical elements having substantially different focal lengths so as to form a pattern.

24. The product of claim 21, wherein said pattern in which said optical elements are arranged comprises a shape selected from the group consisting of a letter, a numeral, a character, and a symbol.

25. The product of claim 1, wherein said optical elements comprise first and second optical elements superimposed on each other.

26. The product of claim 25, wherein said microscopic patterns for said first and second optical elements comprise first and second microscopic patterns superimposed over each other.

27. The product of claim 26, wherein said microscopic patterns for said first and second optical elements comprise first and second sets of ring-shaped optical surfaces, respectively, both said first and second sets of ring-shaped optical surfaces being concentric about a common center point.

28. The optical product of claim 1, wherein said ring patterns comprise a plurality of concentric rings.

29. The product of claim 1, wherein at least one optical element having a first optical power is adjacent to at least one optical element having a second different optical power.

30. The product of claim 1, wherein at least some of the focal lengths are positive and others of the focal lengths are negative such that movement of the viewer causes movement of the image of the viewer in a direction opposite from the movement of the viewer.

31. The product of claim 1, wherein said plurality of optical elements comprises at least 10 optical elements.

32. The product of claim 31, wherein said plurality of optical elements comprises at least 25 optical elements.

33. The product of claim 32, wherein said plurality of optical elements comprises at least 100 optical elements.

34. An optical product comprising:
a sheet of material having a surface, the surface comprising a plurality of optical elements comprised of microscopic patterns in the surface that cooperate to produce an image, each of the elements having optical power and a focal length, at least some of the focal lengths being substantially different from other focal lengths such that the optical power of some of the elements are different, such that multiple images of an object disposed with respect to the surface are formed by respective optical elements at different distances.

35. The optical product of claim 34, wherein said microscopic patterns are symmetric patterns having symmetry about a point.

36. The product of claim 34, wherein at least one optical element having a first optical power is adjacent to at least one optical element having a second different optical power.

37. The product of claim 34, wherein at least some of the focal lengths are positive and others of the focal lengths are negative such that movement of the object causes movement of the image of the object in a direction opposite from the movement of the object.

38. An optical product comprising:
a sheet of material having a surface, the surface comprising a plurality of optical elements comprised of microscopic patterns in the surface that cooperate to produce an image, each of the elements having optical power and a focal length, at least some of the focal lengths being substantially different from other focal lengths such that the optical power of the elements are different, such that some portions of the surface appear to be closer to a viewer than other portions of the surface.

39. The optical product of claim 38, wherein said microscopic patterns are ring patterns.

40. The optical product of claim 38 or 39, wherein the optical elements comprise Fresnel lenses.

41. The optical product of claim 38 or 39, wherein the optical elements comprise holographic optical elements.

42. The product of claim 38, wherein at least one optical element having a first optical power is adjacent to at least one optical element having a second different optical power.

* * * * *

UNITED STATES PATENT AND TRADEMARK OFFICE
CERTIFICATE OF CORRECTION

| | |
|---|---|
| PATENT NO. | : 7,298,533 B2 |
| APPLICATION NO. | : 10/805850 |
| DATED | : November 20, 2007 |
| INVENTOR(S) | : Joel M. Petersen and Christopher Chapman Rich |

It is certified that error appears in the above-identified patent and that said Letters Patent is hereby corrected as shown below:

<u>Column 7</u>

Line 22, delete "piano-convex" and insert -- plano-convex -- therefore.

Signed and Sealed this

Seventeenth Day of June, 2008

JON W. DUDAS
*Director of the United States Patent and Trademark Office*